United States Patent [19]
Ichikawa et al.

[11] Patent Number: 5,766,028
[45] Date of Patent: Jun. 16, 1998

[54] ELECTRICAL CONNECTING DEVICE BETWEEN ROTOR AND STATOR

[75] Inventors: Hidehiro Ichikawa; Hiraku Tanaka; Kazuhito Sakai, all of Shizuoka-ken, Japan

[73] Assignee: Yazaki Corporation, Tokyo, Japan

[21] Appl. No.: 852,503

[22] Filed: May 7, 1997

[30] Foreign Application Priority Data

Jun. 5, 1996 [JP] Japan .................................. 8-142923

[51] Int. Cl.$^6$ .................................................. H01R 35/04
[52] U.S. Cl. .................................................. 439/164; 439/15
[58] Field of Search .................................. 439/164, 15

[56] References Cited

U.S. PATENT DOCUMENTS 5,588,854 12/1996 Ikumi et al. ............................. 439/164
5,655,919 8/1997 Ishikawa et al. ........................ 439/164

FOREIGN PATENT DOCUMENTS 1-83287 6/1989 Japan .
4-11541 1/1992 Japan .
4-61893 5/1992 Japan .
4-129489 11/1992 Japan .

*Primary Examiner*—Gary F. Paumen
*Attorney, Agent, or Firm*—Finnegan, Henderson, Farabow, Garrett & Dunner, L.L.P.

[57] ABSTRACT

An electrical connecting device includes a rotor, a stator having a cover and an under cover, a flexible flat cable wound in a spiral manner and accommodated in an annular space defined between the stator and the rotor, and a locking structure for locking the cover to the under cover. The locking structure includes a plurality of engagement projections formed on the outer periphery of the under cover and a plurality of engagement recess formed on the inner periphery of the cover for engagement with the engagement projections. Since the engagement recesses are arranged on the inner periphery of the cover, the engagement projections under its engagement condition with the engagement recess do not project from the outer peripheral surface of the cover. Therefore, it is possible to avoid undesirable unlocking and breaking of the rocking structure in transporting the device.

6 Claims, 3 Drawing Sheets

ELECTRICAL CONNECTING DEVICE BETWEEN ROTOR AND STATOR

BACKGROUND OF THE INVENTION

The present invention relates to an electrical connecting device which includes a flexible flat cable accommodated in an annular space between a rotor and a stator and wound in a spiral manner, the flat cable having one end secured to the stator and the other end secured to the rotor.

As the electrical connecting device for connecting the stator with the rotor electrically, for example, there is known a device which is adopted for an air-bag system installed in a steering wheel of an automobile. Generally, for the reason that the steering wheel on the rotor side is adapted so as to be rotatable clockwise and counterclockwise in several rotations, in order to electrically connect the steering wheel with a steering column on the stator side, the flexible flat cable (FFC) which is composed of plural conducts is accommodated in a spiral or halfway reversed-spiral manner between the rotor fixed to a steering shaft and the stator fixed to the steering column.

Japanese Patent Publication (kokai) No. 4-11541 discloses the above-mentioned electrical connecting device for connecting the stator with the rotor. In the conventional devise, the connecting device includes a cover as the rotor, into which the steering shaft is inserted and fixed, an under cover as the stator, fixed to the steering column to cover a lower opening of the cover, and a connecting member for connecting the cover with the under cover.

The under cover is provided with a circumferential sidewall, while the cover is provided with an outer peripheral wall for overlapping the sidewall of the cover and an inner peripheral wall into which the steering shaft is inserted. Being wound in a spiral manner, the above-mentioned flexible flat cable is accommodated in an annular space formed between the cover and the under cover. An end on the inner peripheral side of the flexible flat cable is fixed with the inner wall of the cover, while the other end on the outer peripheral side of the cable is fixed with the neighborhood of the sidewall of the under cover. With the rotation of the cover, the flexible flat cable is wound tight or loosened in the annular space, so that the cable can follow the rotation of the steering wheel.

The connecting member provided with a center hole is shaped to be a disc. On the periphery of the center hole, the connecting member has a plurality of engagement hooks formed to project upward. While, the cover is provided, on an inner surface of the inner wall, with engagement recesses for engagement with the engagement hooks. At the center of each engagement recess in the longitudinal direction, a step part is formed for engaging a tip of the engagement hook. In assembling, upon abutting the cover and the under cover to each other so that the sidewall of the undercover enters the inside of the outer peripheral wall of the cover, the connecting member is moved toward the cover from the side of the under cover and thereafter, the engagement hooks are engaged with the step parts of the cover respectively. In this way, the cover and the under cover can be integrated with each other.

As described above, the conventional connecting structure between the cover and the under cover requires the connecting member for connecting the cover with under cover. Since the connecting member is arranged so as to rotate integrally with the cover and frictionally independent of the under cover, the sliding resistance in rotating the steering wheel is increased to spoil the reliability of the device.

On the contrary, Japanese Utility Model publication No. 4-129489 discloses another electrical connecting device between the rotor and the stator. The stator is composed of a cover and an under cover which are connected to each other to form a housing. Further, a flexible flat cable which connects a steering shaft with a steering column electrically is wound spirally and accommodated in an annular space defined between the rotor and the housing.

The cover having the flexible flat cable accommodated therein is connected with the under cover through the intermediary of flanges formed on the covers for attachment with the steering column. On condition that the cover is overlaid on the under cover, the respective flanges of the covers are riveted with each other. Then, making use of so-fixed flanges, the integrated covers are attached to the steering column by means of mounting screws.

In the above-mentioned device, since the rotor is arranged to rotate between the cover and the under cover riveted together and it is not required of such a connecting member as mentioned in the former art, it will be expected that the sliding resistance in rotating the steering wheel becomes to be smaller and the detachment of the covers is hard to occur.

In the device, however, there are drawbacks of the complicated riveting operation of the covers, an increase of manufacturing cost because of the large number of components and so on. In addition, since each of the mounting flanges has to be provided with a screw hole for attaching the assembly to the steering column and a further rivet-hole for connecting the cover with the under cover, the mounting flange becomes to be large-sized. Therefore, it is difficult to install the connecting device in the steering column having a restricted working space in the circumference. Further, being great hindrances in transporting the connecting device, the large-sized flanges may cause the connecting device to be broken.

On the contrary, it has been supposed a locking structure which comprises projections formed on the outer surface of the under cover and hooks formed on the outer surface of the cover and in which the cover can be integrated with the under cover by engaging the projections with the hooks respectively. In this case, the stator into which the steering shaft is inserted and fixed is arranged so as to rotate between the cover and the under cover.

According to the above-mentioned locking structure, it is possible to reduce the sliding resistance in rotating the steering wheel and to avoid the increasing in cost and size of the device because of needless of the rivets.

Also in the locking structure, however, since the hooks are disposed projecting from the outer surface of the cover, there is a possibility that the hooks interfere with the surroundings when the device is transported and attached to the steering column. Consequently, the cover may be detached from the under cover or broken disadvantageously.

SUMMARY OF THE INVENTION

It is therefore an object of the present invention to provide an electrical connecting device having a locking structure for connecting a cover with an under cover, which is capable of preventing the cover from disengaging from the under cover and being broken.

The object of the present invention described above can be accomplished by an electrical connecting device comprising, in combination:

a rotor;

a stator arranged on the outside of the rotor, the stator comprising two covers which have respective parting surfaces perpendicular to a center axis of the rotor rotating;

a flexible flat cable wound in a spiral manner and accommodated in an annular space defined between the stator and the rotor, the flexible flat cable having one end fixed with the stator and the other end fixed with the rotor; and locking means for locking the covers together, the locking means being provided on outer peripheries of the covers;

wherein the locking means comprises at least one engagement projection formed on the outer periphery of one of the covers to project outward and at least one engagement recess formed on the outer periphery of the other cover for engagement with the engagement projection.

With the arrangement mentioned above, since the engagement recess is arranged on the inner periphery of the other cover, the engagement projection under its engagement condition with the engagement recess does not project from the outer peripheral surface of the cover. Therefore, it is possible to avoid undesirable unlocking and breaking of the rocking means, whereby the reliability in transporting and mounting the electrical connecting device can be improved. In addition, since the locking means has no element projecting from the outer peripheral surface of the cover, it is possible to miniature the electrical connecting device, so that the workability in mounting can be improved.

In the present invention, preferably, the covers are respectively provided with cylindrical sidewalls and the at least one engagement projection is formed on an outer peripheral surface of one of the covers, while the at least one engagement recess is constituted by at least one through hole penetrating the cylindrical sidewall of the other cover.

More preferably, the cylindrical sidewall of the one of the covers consists of a large diameter part and a small diameter part and the at least one engagement projection is formed on the small diameter part.

Preferably, the at least one engagement projection comprises a tapered surface arranged on the upper side of the engagement projection and an engagement surface arranged on the lower side of the engagement projection for engagement with the other cover.

More preferably, the at least one engagement projection is arranged so that a tip thereof forms the same plane as the outer peripheral surface of the large diameter part.

Preferably, the outer peripheral surface of the cylindrical sidewall of the other cover forms the same plane with the outer peripheral surface of the large diameter part of the cover.

These and other objects and features of the present invention will become more fully apparent from the following description and appended claims taken in conjunction with the accompany drawing.

DESCRIPTION OF THE PREFERRED EMBODIMENT

An embodiment of the present invention will be described with reference to the drawings.

Figure 1:
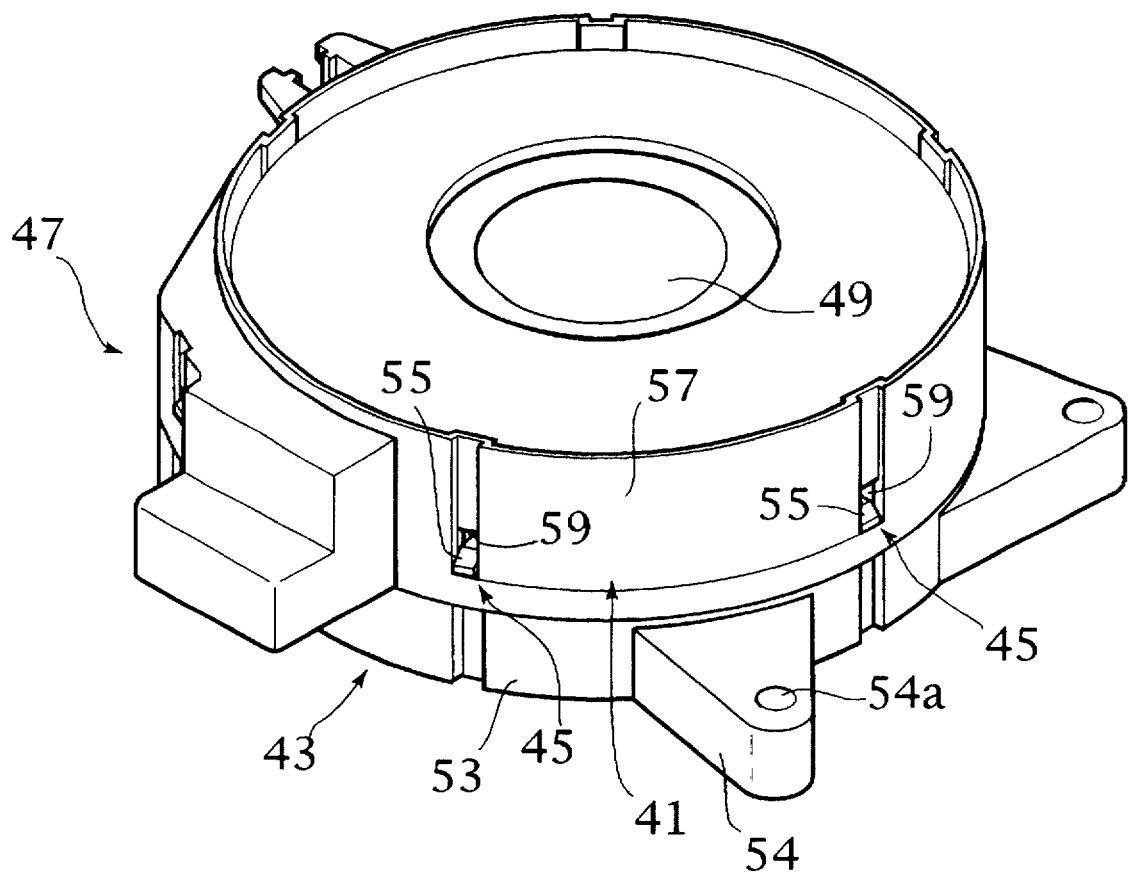
FIG. 1 is a perspective view of an electrical connecting device between a rotor and a stator, in accordance with an embodiment of the present invention, showing a locking structure for connecting a cover with an under cover.
Figure 2:
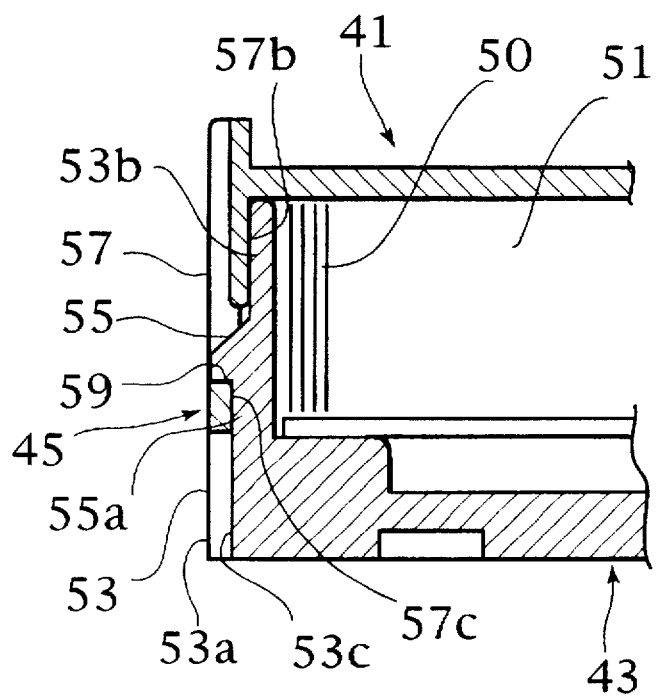
FIG. 2 is a cross sectional view of the locking structure of FIG. 1.

FIG. 1 is a perspective view of a locking structure 45 as a joint between a cover 41 and an under cover 43, which constitutes a component of an electrical connecting device between a rotor 49 and a stator 47, in accordance with the embodiment of the present invention. Note, the electrical connecting device is used for an air-bag system installed in a steering wheel of an automobile. FIG. 2 is a cross sectional view of the locking structure 45. In the embodiment, the cover 41 and the under cover 43 constitute the stator 47. Rotatably arranged at the center of the stator 47 is the rotor 49 to which a not-shown steering shaft is inserted and fixed. The stator 47 is constituted by the cover 41 and the under cover 43. Both of the cover 41 and the under cover 43 have parting surfaces perpendicular to an axis as a center of the rotating rotor 49. A flexible flat cable 50 is spirally wound and accommodated in an annular space 51 defined between the stator 47 and the rotor 49.

Figure 3:
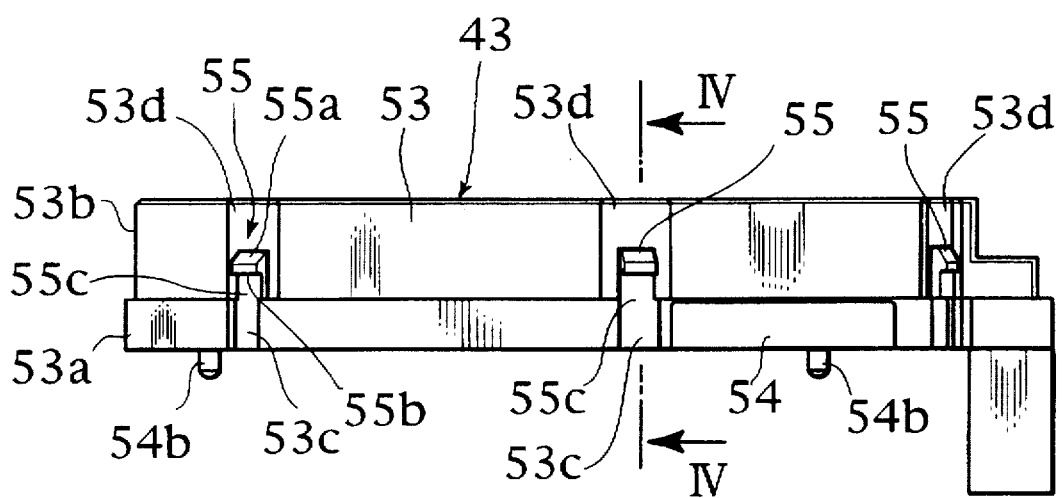
FIG. 3 is a side view of the under cover of the device of FIG. 1.
Figure 4:
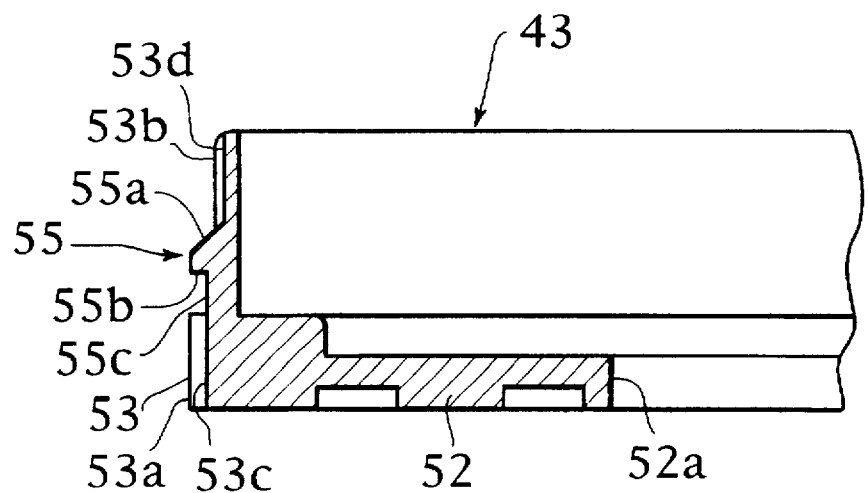
FIG. 4 is a cross sectional view of the under cover, taken along a line of IV—IV of FIG. 3.

As shown in FIGS. 3 and 4, the under cover 43 is composed of a bottom wall 52 having an opening 52a to which the rotor 49 is rotatably attached, and a cylindrical sidewall 53 for med about the bottom wall 52. The sidewall 53 consists of a large diameter part 53a on the lower side of the under cover 43 and a small diameter part 53b on the upper side. The small diameter part 53b is provided, on the outer peripheral face, with a plurality of engagement projections 55 projecting radially outward. Each engagement projection 55 includes a tapered face 55a on the upper side and an engagement face 55b on the lower side. As will be obvious from FIG. 4, an outer peripheral surface of the engagement projections 55, in which the respective tips are included, is substantially identical to the outer peripheral surface of the large diameter part 53a.

Each base 55c of the engagement projection 55 is formed to project from the outer peripheral surface of the small diameter part 53b slightly so that the outer surface of the base 55c is on the same plane with a groove 53c on the large diameter part 53a. Again, the small diameter part 53b in the vicinity of the engagement projections 55 is provided with a plurality of small recesses 53d extending up and down. On the outer peripheral surface of the large diameter part 53a, a plurality of attachment flanges 54 are formed to fix the under cover 43 with the steering column, as shown in FIGS. 1 and 3. The attachment flanges 54 are provided with attachment holes 54a to which not-shown screws are inserted. On the lower surface of the large diameter part 53a, positioning pins 54b are provided for positioning the under cover 43 with respect to the steering column.

Figure 5:
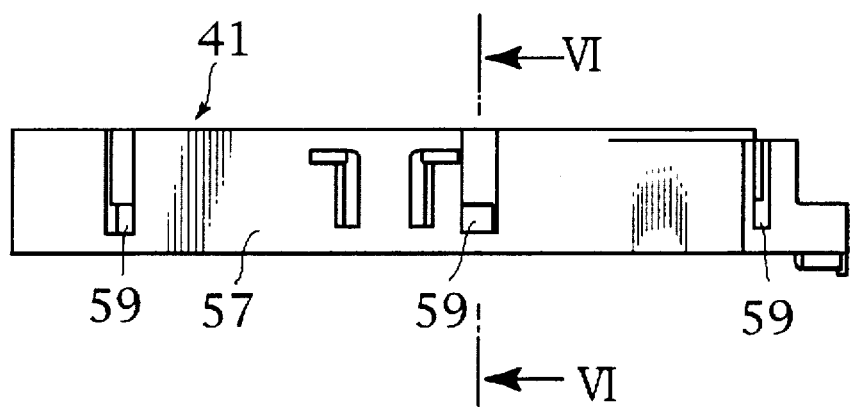
FIG. 5 is a side view of the cover of the device of FIG. 1.
Figure 6:
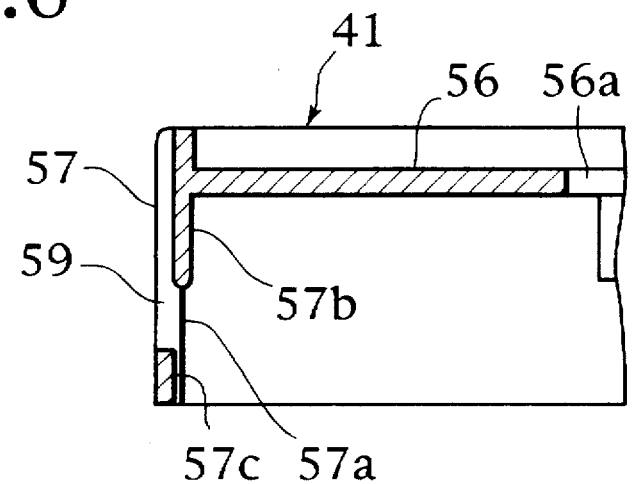
FIG. 6 is a cross sectional view of the cover, taken along a line of VI—VI of FIG. 5.

While, as shown in FIGS. 5 and 6, the cover 41 comprises a top wall 56 having an opening 56a to which the rotor 49 is rotatably attached, and a cylindrical sidewall 57 formed about the top wall 56. The sidewall 57 is provided, as engagement recesses, with a plurality of through holes 59 for engagement with the engagement projections 55 of the under cover 43. Further, the sidewall 57 is adapted in a manner that the inner surface 57a of FIG. 6 adheres to the outer peripheral surface of the small diameter part 53b of the under cover 43. On the upper side of the through holes 59, convex portions 57b are formed projecting from the inner peripheral surface 57a slightly to coordinate the recesses 53d of the under cover 43, respectively. While, on the lower side of the through holes 59, concave portions 57c are formed sinking from the inner peripheral surface 57a slightly to coordinate the bases 55c of the under cover 43, respectively. Further, the outer peripheral surface of the sidewall 57 of the cover 41 forms the same plane with the outer peripheral surface of the large diameter part 53a of the under cover 43.

In the above-mentioned locking structure 45 between the cover 41 and the under cover 43, when the cover 41 is put on the under cover 43 so that the sidewall 57 of the cover 41 overlays the small diameter part 53b of the sidewall 53 of the under cover 43, the engagement projections 55 come into the through holes 59 while the lower end of the sidewall 57 of the cover 41 is guided by the tapered surfaces 55a of the engagement projections 55 of the under cover 43. Finally, by the engagement of the engagement surfaces 55b in the through holes 59, the cover 41 can be integrated and locked with the under cover 43.

Under such a locked condition, since the lower end of the cover 41 comes into contact with a step part between the large diameter part 53a and the small diameter part 53b of the under cover 43, the outer peripheral surface of the cover 41 makes the same plane with the outer peripheral surface of the large diameter part 53a of the under cover 43. In this state, since the engagement projections 55 are inserted into the through holes 59 penetrating through the sidewall 57 and do not project from the identical outer peripheral surfaces of the cover 41 and the under cover 43, the rocking structure 45 consisting of the engagement projections 55 and the engagement recesses (i.e. the through holes 59) does not produce any protrudings from the outer peripheral surface of the assembled connecting device. Consequently, even when transporting and attaching the electrical connecting device to the steering column, it is possible to prevent the locking structure 45 from interfering with the surroundings, so that the detaching and breaking of the device can be avoided to improve the reliability of product.

Especially, when it is required to accommodate the electrical connecting device in such a restricted area as the interior of the steering wheel of the air-bag system of the automobile, it is possible to miniaturize the device because of no protrudings of the locking structure 45 and to improve the workability in mounting the device.

Again, during engaging the engagement projection 55 into the through holes 59 respectively, the engagement operation is progressed under condition that the tips of the engagement projections 55 come into the concave portions 57 formed on the under side of the through holes 59. Accordingly, since the undesirable rotation of the cover 41 with respect to the under cover 43 is avoided during the engagement operation, it is possible to facilitate the operation.

Finally, it will be understood by those skilled in the art that the foregoing description is one of preferred embodiments of the disclosed electrical connecting device, and that various changes and modifications may be made to the present invention without departing from the spirit and scope thereof.

What is claimed is:

1. An electrical connecting device comprising, in combination:

a rotor;

a stator arranged on the outside of said rotor, said stator comprising two covers which have respective parting surfaces perpendicular to a center axis of said rotor rotating;

a flexible flat cable wound in a spiral manner and accommodated in an annular space defined between said stator and said rotor, said flexible flat cable having one end fixed with said stator and the other end fixed with said rotor; and locking means for locking said covers together, said locking means being provided on outer peripheries of said covers;

wherein said locking means comprises at least one engagement projection formed on the outer periphery of one of said covers to project outward and at least one engagement recess formed on the periphery of the other cover for engagement with said engagement projection.

2. An electrical connecting device as claimed in claim 1, wherein said covers are respectively provided with cylindrical sidewalls and wherein said at least one engagement projection is formed on an outer peripheral surface of one of said covers, while said at least one engagement recess is constituted by at least one through hole penetrating said cylindrical sidewall of the other cover.

3. An electrical connecting device as claimed in claim 2, wherein said cylindrical sidewall of the one of said covers comprises of a large diameter part and a small diameter part and wherein said at least one engagement projection is formed on said small diameter part.

4. An electrical connecting device as claimed in claim 3, wherein said at least one engagement projection comprises a tapered surface arranged on the upper side of the engagement projection and an engagement surface arranged on the lower side of the engagement projection for engagement with the other cover.

5. An electrical connecting device as claimed in claim 4, wherein said at least one engagement projection is arranged so that a tip thereof forms the same plane as the outer peripheral surface of said large diameter part.

6. An electrical connecting device as claimed in claim 5, wherein the outer peripheral surface of said cylindrical sidewall of the other cover forms the same plane with the outer peripheral surface of said large diameter part of the cover.

* * * * *